(12) United States Patent
Gallas et al.

(10) Patent No.: US 7,029,758 B2
(45) Date of Patent: Apr. 18, 2006

(54) MELANIN POLYVINYL ALCOHOL PLASTIC LAMINATES FOR OPTICAL APPLICATIONS

(76) Inventors: James Gallas, 1615 Wood Quail, San Antonio, TX (US) 78248; Melvin Eisner, 3506 N. Parkwood, Houston, TX (US) 77021

(*) Notice: Subject to any disclaimer, the term of this patent is extended or adjusted under 35 U.S.C. 154(b) by 152 days.

(21) Appl. No.: 10/261,266

(22) Filed: Sep. 30, 2002

(65) Prior Publication Data

US 2003/0092794 A1    May 15, 2003

Related U.S. Application Data

(60) Provisional application No. 60/326,761, filed on Oct. 4, 2001.

(51) Int. Cl.
  *B32B 27/00* (2006.01)
  *C08J 3/00* (2006.01)
  *C08L 89/00* (2006.01)

(52) U.S. Cl. .................. 428/474.4; 428/411.1; 359/350; 359/355; 523/106; 264/1.31; 264/1.32; 252/582; 252/588; 527/201; 527/202; 527/203

(58) Field of Classification Search ............. 428/474.4, 428/411.1; 359/350, 355; 523/106; 252/582, 252/588; 264/1.31, 1.32; 527/201–203
See application file for complete search history.

(56) References Cited

U.S. PATENT DOCUMENTS

| | | | | |
|---|---|---|---|---|
| 4,698,374 A | * | 10/1987 | Gallas | 523/106 |
| 5,036,115 A | * | 7/1991 | Gallas | 523/106 |
| 5,047,447 A | * | 9/1991 | Gallas | 523/106 |
| 5,112,883 A | * | 5/1992 | Gallas | 523/106 |
| 5,158,718 A | * | 10/1992 | Thakrar et al. | 264/1.36 |
| 5,187,207 A | * | 2/1993 | Gallas | 523/106 |

OTHER PUBLICATIONS

"Spectroscopical properties of porphyrin-melanin in polyvinyl alcohol film", Izabela Hanz et al, Abstract, Department of Molecular Physics, Institute of Physics., Poznan University of Technology, Piotrowo 3, 60-965 Poznan, Poland.*

* cited by examiner

Primary Examiner—P. Hampton Hightower

(57) ABSTRACT

The present invention relates to the use of water soluble melanin in solid plastic films of polyvinyl alcohol to be used in conjunction with other plastics to make laminated sheets or lenses. Such laminates will be used as filters to protect against photochemical damage from electromagnetic radiation.

18 Claims, 3 Drawing Sheets acetate

PVA acetate

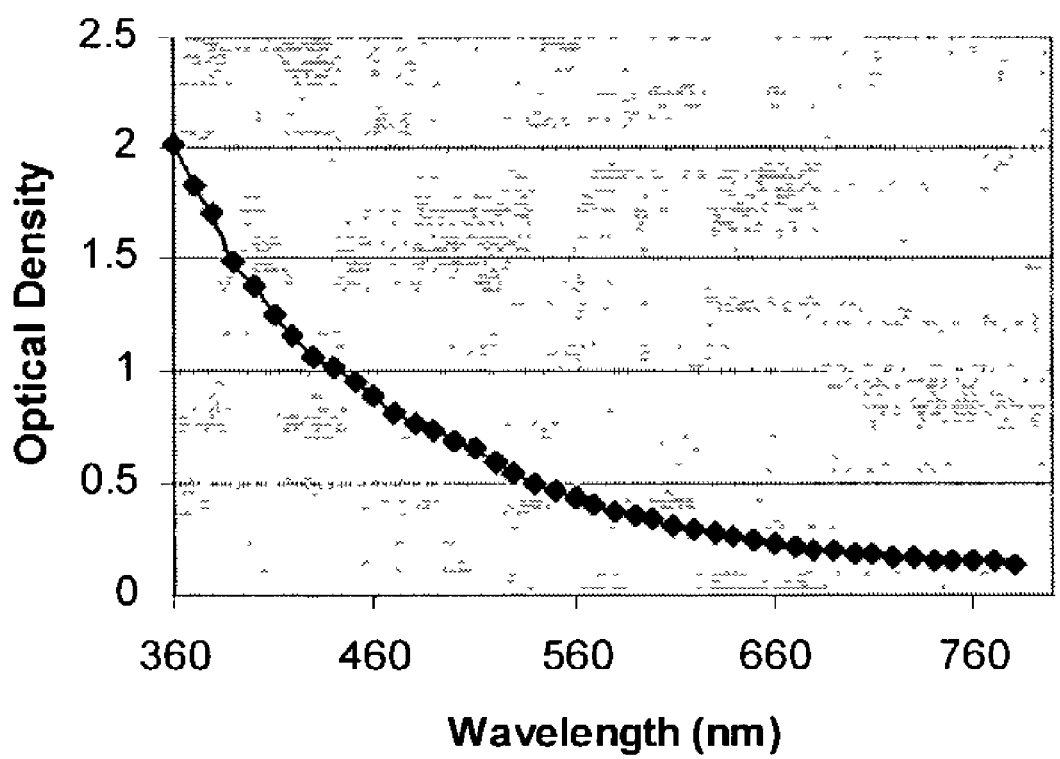

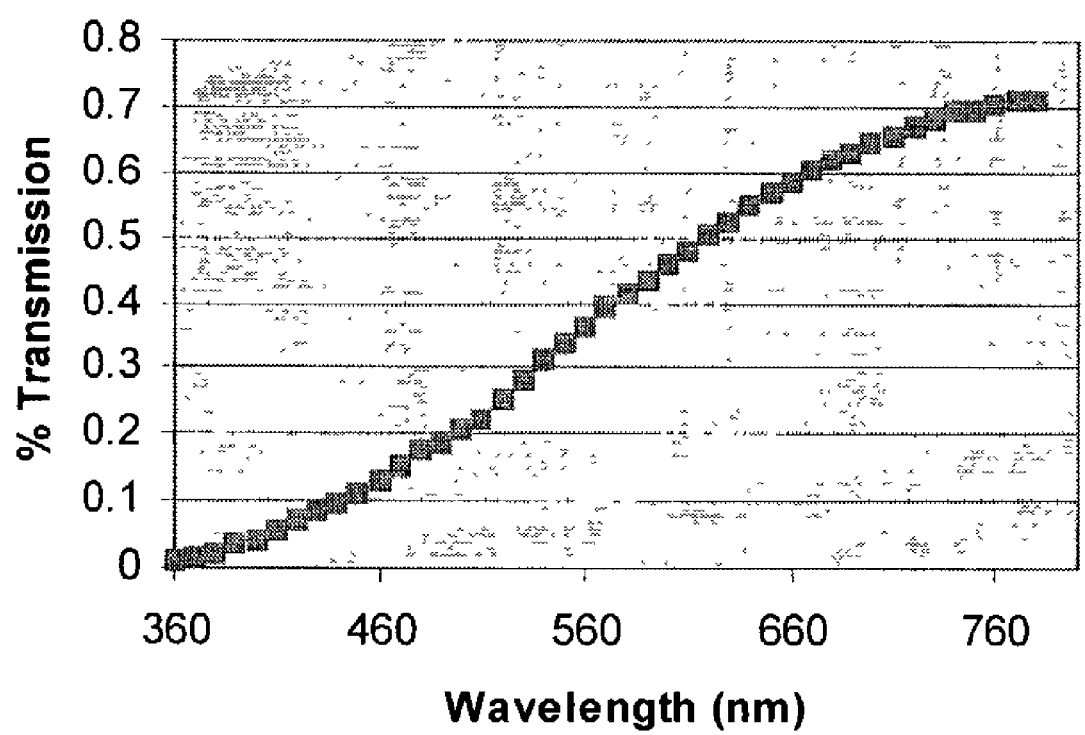

MELANIN POLYVINYL ALCOHOL PLASTIC LAMINATES FOR OPTICAL APPLICATIONS

CROSS-REFERENCE TO RELATED APPLICATIONS

This application claims the benefit of Provisional Application No. 60/326,761, filed Oct. 4, 2001.

A provisional application has been made for this patent by the same inventors in October., 2001.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

Prior art has described the photoprotective benefits of melanin-based light filters (Gallas, U.S. Pat. Nos. 4,698,374; 5,112,883; 5,036,115; 5,047,447) and methods for incorporation of melanin into various plastics.

Melanin is the pigment, as defined in the Gallas patents, and is traditionally synthesized by dissolving a suitable precursor, broadly a biological phenol, in water, incorporating an oxidizing agent—generally oxygen—and adjusting the pH to a sufficiently high value so as to allow polymerization to proceed. Under a free radical, autoxidation process, melanin is produced as a black, optically clear suspension. Under these conditions, particle sizes are approximately 50 A in size and such suspensions are optically clear, without any objectional haze or light scatter. Such suspensions are referred to in this application as either aqueous melanin or traditional melanin.

In most of the prior art involving applications of melanin in plastic light filters, it was necessary to incorporate melanin into optically clear, plastic substrates. This has been done by dispersing melanin powder into either liquid plastic monomer, followed by a curing process to harden the plastic, that is, in a thermoset process; or, melanin was dispersed in an extrusion process in which plastic, already formed was caused to flow and function as a solvent for the melanin, that is, in a thermoplastic process.

An essential point of this invention is that, in both cases above, it was necessary to first chemically modify, or derivatize, the aqueous melanin in order to disperse it so uniformly as to reduce any light scatter or haze to levels that would be acceptable in ophthalmic applications such as sunglass lenses. More specifically, aqueous or traditional melanin is an inherently hydrophilic polymer when synthesized in the traditional manner described above; and this makes it impossible to achieve a level of dispersion in liquid plastic or liquid plastic resin that results in adequately low haze for optical applications. For this reason, it is necessary to take strong and costly measures to chemically modify the polymeric surface groups in melanin, that, without such modification, render it hydrophilic, when trying to disperse it in plastics.

Another disadvantage to the prior art involving chemically modified melanins is that the derivatization process changes the optical spectrum of the melanin. Generally, the result is a bleaching of the spectrum with a loss in the optical density in the red part of the spectrum. This bleaching becomes further intensified during a thermoset process where the use of oxidizing curing agents causes still more bleaching of the melanin. Normally this problem is minimized by carefully choosing a suitable dye to restore the loss in the optical density in the red part of the spectrum. And in the case of a thermoplastic process, where an optically clear plastic is compounded with the derivatized melanin powder and extruded under high temperatures—greater than 200 degrees Celsius—and pressures, there is a frequent tendency for haze to develop in the plastic—possibly because of degradation of the melanin, producing low molecular weight volatiles or other degrading chemical reactions at such high temperatures.

Finally, there is a reduced solubility of even derivatized melanin in various plastics, which limits the concentration of the melanin and hence the darkness of the final filter because reduced solubility means unacceptable haze.

BRIEF SUMMARY OF THE INVENTION

The problems cited above are significantly reduced by using polyvinyl alcohol—also called PVA—as the host plastic, and represents an improvement over the current art by combining aqueous melanin with PVA. In short, aqueous melanin is mixed directly with the plastic in one step. The authors note that there was prior art that describes the use of PVA-melanin-porphyrin films ("Spectroscopical properties of porphyrin melanin in polyvinyl alcohol film," by Izabela Hanz, et. al., Department of Molecular Physics, Institute of Physics, Pozman University of Technology, Piotrowo 3, 60-965 Pozman, Poland). However, the purpose of that publication was to study the photochemical and luminescence behavior of melanin/porphyrin complexes in a plastic media. The PVA used in that publication was to provide a rigid matrix for the melanin polymer, normally dispersed in an aqueous media as it is known that the luminescence of polymers is affected by the rigidity of the surrounding media. The purpose of this invention, however, is to exploit the PVA-melanin films system as a component of an ophthalmic lens system and which solves the aforementioned problems associated with the prior art of melanin-plastic ophthalmic systems.

BRIEF DESCRIPTION OF THE SEVERAL VIEWS OF THE DRAWING

FIG. 2. Shows the optical density for a melanin/PVA film over the visible wavelength region from 360 nm to 780 nm. The curve shows the characteristic smooth, melanin absorption that increases monotonically with the energy of the light.

FIG. 3. Shows the optical transmission for the melanin/PVA film of FIG. 2 over the same visible wavelength region from 360 nm to 780 nm. The transmission is lowest where the risk of photochemical damage to the eye is greatest, and progressively increases as the risk of damage decreases.

DETAILED DESCRIPTION OF THE INVENTION

Figure 1:
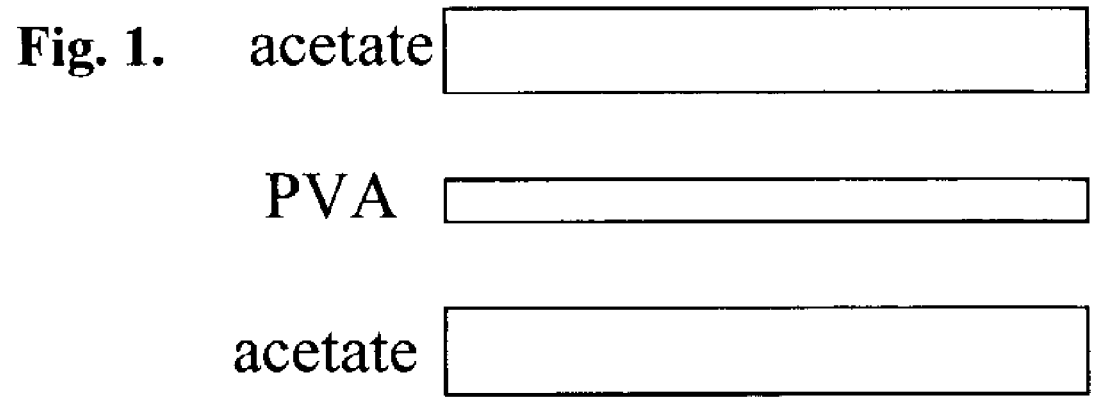
FIG. 1. A Thin film of PVA, sandwiched between two tinted, or untinted sheets of optically transparent plastic, such as cellulose acetate. The outer two sheets of plastic provide mechanical support to the thin film of PVA and also provide a means of adding additional tint that may be incorporated into the sheets.

Melanin that is synthesized in aqueous media at suitably high pH values is comprised of particles that are too small to scatter visible light. Nominally, these particle sizes range from about 20 A to 100 A. However, if environmental conditions change so that the pH is lowered or if metal ions become introduced into the aqueous media, the small non-light-scattering melanin particle can aggregate into larger particles that do scatter visible light. In that case, any lens using such melanin to filter sunlight will have objectionable haze.

The essential feature of this invention is that once well-dispersed and non-aggregated hydrophilic melanin particles are prepared at the proper pH values and with little or no divalent metal ions present, their non-aggregated state may be preserved by dispersing such melanin in PVA-aqueous solutions that are liquified by heating and subsequently solidified by cooling to room temperature.

Upon combination of the aqueous melanin with the aqueous PVA solution, the melanin particles are immediately solvated and sequestered by hydrogen-bonding with the polyvinyl alcohol polymer structure. Because this homogeneous dispersion occurs at the molecular level, there is, in the liquid state, no light scatter observed by visible light.

Upon solidification of the PVA-melanin films, the small, non-light scattering melanin particles are trapped and sequestered by the pores and voids formed around them by the PVA and the initial high level of dispersion of the melanin particles in the PVA system is thus preserved.

It should be noted that while polarizers are dispersed into PVA films in a manner similar to the one described here, there are several important differences. First, the PVA films used for the polarizers are always stretched—so as to orient the dye molecules. Our application does not require this feature. Secondly, the dyes used in polarizers are generally non-aggregating and the use of the PVA films in those cases is not done in order to preserve the dye in its non-aggregating state.

Because the techniques described here could be applied to other hydrophilic molecules like melanin, which are prone to aggregation because of changing environmental agents like metal ions and pH changes, the current patent application is not limited to melanin or even PVA, as other hydrophilic or hydrogen-bonding, optically clear plastics would operate similarly.

Manner and Process of Making the Invention

In this invention underivatized, hydrophilic, aqueous melanin is incorporated into PVA films or sheets. Such sheets or films are generally 1–3 mils thick and are therefore too thin to be self-supporting. Thus, they are typically sandwiched between thicker sheets of other plastics such as cellulose acetate, or polycarbonate that do provide adequate mechanical support or stiffness. This arrangement is shown in FIG. 1. The laminates thus formed are used without further fabrication to function as light filters, in cases like polarized PVA light filters. Or, such laminates may be fashioned into curved, circular discs that are inserted into molds where clear, untinted plastic or plastic resin is injected around the circular disc laminates—either in a thermoset or a thermoplastic process—thereby encapsulating the circular disc laminate. In this manner a semi-finished ophthalmic lens blank, or a sunglass lens blank is produced with its tinting supplied by the encapsulated PVA/melanin/plastic laminate.

This application describes the techniques for making the PVA melanin films and how they are used to produce PVA/plastic laminates. It does not detail the construction of the supporting acetate or polycarbonate sheets that are used to provide support to the PVA/melanin film or the lamination of the PVA/melanin film to the supporting sheets as this process is well-known to those skilled in the art.

The general process for making this invention is to first produce aqueous, or hydrophilic melanin in water. The details for making aqueous melanin are well-known and are described in the book by R. A. Nicolaus, published in 1968 by Hermann 115, Boulevard Saint-Germaine, Paris, France (hereafter "Nicolaus") which work is incorporated herein by reference. PVA powder is also dispersed in water by injecting some amount of PVA into boiling water. The two aqueous dispersions are combined and a PVA-melanin film is then formed by casting this aqueous dispersion onto a suitable flat substrate and then allowing the water to evaporate. Evaporation of the water results in a solid film of PVA with melanin dispersed at a level sufficient to provide acceptably low light scatter and haze for optical application. This occurs provided that certain chemical environments are ensured. Prominent among such chemical conditions are a) to make sure that the pH of the aqueous solutions are sufficiently high and b) that divalent and trivalent metal ion concentrations are kept adequately low. If conditions a) and b) are not met, then aqueous melanin dispersions will display unacceptable level of light scatter for optical lens applications because of aggregation of the melanin Acceptably high pH values depend on the melanin precursor that is used. If L-Dopa, for example, is used as the precursor in aqueous media, then the melanin so formed, requires a pH of 6, or above, in order that haze-causing aggregation does not occur. For aqueous melanin that uses catechol as the precursor, a pH of 8 or above is required to avoid aggregation; and for aqueous suspensions of melanin that use dopamine as the precursor, a pH of 9, or above is required.

Preferred Embodiment

In the preferred embodiment of this invention, aqueous suspensions of melanin are made, according to the traditional methods, as discussed in Nicolaus, by dissolving a melanin precursor into water and by adding an oxidizing agent such as oxygen or potassium persulphate, and by increasing the pH, by adding sodium hydroxide, for example. Under these conditions, hydrophilic or aqueous melanin is produced and, in this invention, the pH is insured to remain sufficiently high and di-valent metal ions are ensured to be absent, so that the particle sizes of the final melanin solution are less than 100 A as can be verified by small-angle X-ray scattering.

To make the aqueous solution of PVA, PVA powder is put into water and the suspension is heated to 100 degrees Celsius, in order to completely disperse the PVA. The two aqueous suspensions of melanin and PVA are combined and form a well-dispersed suspension of PVA and melanin. A melanin-containing PVA film is cast by injecting the PVA/melanin suspension onto a suitable, flat substrate, using standard techniques by those skilled in the art, for example onto plastic or glass, and the water is allowed to evaporate. It should be noted that this technique of incorporating aqueous-based melanin into water-soluble PVA plastic is not limited to the use of PVA, so that any water soluble plastic that is transparent to light.

The PVA film is cast to a thickness of approximately 1–3 mils (thousandths of an inch) and is sandwiched between optically clear plastic sheets such as cellulose acetate or polycarbonate (as in FIG. 1) whose thicknesses are nominally 5 to 20 mils thick, but could be thinner or thicker. Their primary function is to impart mechanical stability to the otherwise non-rigid, flexible, 1–3 mil thick sheet of PVA film.

EXAMPLE 1

2 grams of PVA powder were dispersed into 100 ml of boiling water. The water was obtained by distillation and filtration and had an electrical resistance of 20 Mega-Ohms to ensure that the concentration of divalent or trivalent metal ions was kept adequately low. The pH of the aqueous-PVA suspension thus formed was between 7 and 7.5. Aqueous melanin was synthesized, using L-dopa as the precursor, according to the method described by Sealy ("Structure and reactivity of melanins," In: Free Radicals in Biology, W. A. Pryor (ed), New York: Academic Press, 1980, pp. 209–259). The water was obtained from the same source as that used to make the PVA suspension. Its pH was adjusted to be 7.5 by using sodium hydroxide and its concentration was adjusted to be 0.1 mg/ml by evaporation of some of the water to yield a 10% melanin dispersion in water. 2 ml of the 10% melanin suspension, at a temperature of 25 degrees Celsius was introduced into the 100 ml aqueous suspension of PVA to form a well-dispersed PVA-Melanin suspension in water. Approximately 5 cc of the PVA-melanin suspension thus formed was then deposited onto a clear glass plate and the water was allowed to evaporate forming a solid film of PVA. The dispersion of the melanin in the PVA films was sufficiently high that the film appeared optically clear and free of haze. A digital micrometer was used to determine the thickness of the film to be 1.2 mils. An optical absorption spectrum (optical density) and a transmission spectrum for the melanin-PVA film of example 1 is shown in FIG. 2 and FIG. 3 respectively.

It is a significant result of this invention that these spectra show that percent transmission levels, adequately low for sunglass applications, are achievable in our PVA/melanin films, even though the film thicknesses are very small. It is also significant and an advantage, that despite the high concentrations of melanin in the PVA (approximately 10%), the melanin is still well-dispersed and not aggregated to the point of causing haze or excessive light scatter that would compromises it use in ophthalmic devices.

Other advantages to using aqueous melanin solutions in PVA over the prior art are that the aqueous melanin solutions may be chemically altered and then combined with the PVA to form films with the alterations not further compromised by the combination with the PVA. In contrast, the optical properties of derivatized melanins will be affected by thermoset or thermoplastic processing.

It is also possible to modify such melanin-PVA films, by those skilled in the art, so that the films absorb iodine molecules for the purpose of making melanin-PVA polarizing films which are then sandwiched between other optically clear plastic sheets such as cellulose acetate and polycarbonate, as shown in FIG. 1, but not limited to these choices of plastics.

Hydrophilic polymer like melanin can also be adsorbed into a clear and untinted PVA film by submerging the PVA film into an aqueous solution containing the dye.

Alternatively, the hydrophilic dye may be compounded with the PVA powder in the traditional manner in which thermoplastics and dyes are blended by heat and pressure Applications for such melanin-plastic laminates include, but are not limited to sunglasses, ski goggles, ophthalmic prescription lenses, helmets, windows, filters for artificial lighting and other light filters that separate potentially damaging UV and High energy visible light from people and valuable goods.

The invention claimed is:

1. An apparatus for filtering ultraviolet and high energy visible light emitted from natural or artificial sources, comprising a polyvinyl alcohol (PVA) containing a hydrophilic polymer that is non-aggregated and optically clear.

2. An apparatus for filtering ultraviolet and high energy visible light emitted from natural or artificial sources, comprising a water soluble plastic film containing melanin that is non-aggregated and optically clear.

3. An apparatus according to claim 1 further including a plastic sheet wherein the polyvinyl alcohol film is attached to the plastic sheet for support.

4. An apparatus according to claim 2 wherein the water soluble plastic film contains a polarizer.

5. An apparatus according to claim 1 wherein the polyvinyl alcohol film (PVA) contains a polarizer.

6. An apparatus according to claim 1 wherein the hydrophilic polymer is melanin.

7. An apparatus according to claim 2 further including a plastic sheet wherein the water soluble plastic film is attached to the plastic sheet for support.

8. An apparatus according to claim 2 further including:
a first plastic sheet; and
a second plastic sheet;
the water soluble plastic film being sandwiched between the first plastic sheet and the second plastic sheet.

9. An apparatus according to claim 8 wherein the water soluble plastic film is polyvinyl alcohol.

10. An apparatus according to claim 1 further including:
a first plastic sheet; and
a second plastic sheet;
the polyvinyl alcohol film being sandwiched between the first plastic sheet and the second plastic sheet.

11. An apparatus according to claim 4 wherein the water soluble plastic film is polyvinyl alcohol.

12. An apparatus according to claim 3 wherein the hydrophilic polymer is melanin.

13. An apparatus according to claim 8 wherein the water soluble plastic film contains a polarizer.

14. An apparatus according to claim 10 wherein the polyvinyl alcohol film contains a polarizer.

15. An apparatus according to claim 14 wherein the hydrophilic polymer is melanin.

16. An apparatus according to claim 3 wherein the polyvinyl alcohol film contains a polarizer.

17. An apparatus according to claim 4 further including a plastic sheet wherein the water soluble plastic film is attached to the plastic sheet for support.

18. An apparatus according to claim 11 further including a plastic sheet wherein the polyvinyl alcohol film is attached to the plastic sheet for support.

* * * * *